United States Patent [19]

Wormser

[11] 4,279,207
[45] Jul. 21, 1981

[54] FLUID BED COMBUSTION

[75] Inventor: Alex F. Wormser, Marblehead, Mass.

[73] Assignee: Wormser Engineering, Inc., Middleton, Mass.

[21] Appl. No.: 31,782

[22] Filed: Apr. 20, 1979

[51] Int. Cl.³ .............................................. F23B 7/00
[52] U.S. Cl. ..................................... 110/345; 423/244
[58] Field of Search ..................... 122/4 D; 266/172; 423/244 A; 110/263, 265, 342–345, 347

[56] References Cited

U.S. PATENT DOCUMENTS

| | | | |
|---|---|---|---|
| 3,672,577 | 6/1972 | Kramer | 266/172 X |
| 3,717,700 | 2/1973 | Robison et al. | 423/244 A |
| 4,135,885 | 1/1979 | Wormser et al. | |

FOREIGN PATENT DOCUMENTS 1431763 4/1976 United Kingdom .................... 122/4 D

OTHER PUBLICATIONS

P. H. Calderbank, "A New Flue-Gas $SO_2$-Removal Process Using Activated Chalk in a Fluidized Bed at 460°–550° C."–1978.

Primary Examiner—Charles A. Ruehl

[57] ABSTRACT

A fluid bed reactor in which a gas is reacted with small particles of solid, rubbed off in the fluid bed from larger particles of solid.

12 Claims, 9 Drawing Figures

FLUID BED COMBUSTION

FIELD OF THE INVENTION

This invention relates to burning and desulfurizing coal.

BACKGROUND OF THE INVENTION

Some related background is set forth in U.S. Pat. No. 4,135,885, "Burning and Desulfurizing Coal", the contents of which are herein incorporated by reference.

Coal burners with fluid bed desulfurization using sorbents such as limestone are known in the prior art. However, these prior art devices have not been adequately satisfactory. They have been characterized by inefficient use of sorbents, inadequate removal of sulfur except at the expense of uneconomical inefficient use of sorbents, and inability to make use of many available sorbent materials. Using softer limestones resulted in fragmentation and blowing away before adequately reacting; using harder limestones resulted in sulfate coating that reduced reactivity. Also, the large particle size limestone discharged in prior art devices has caused designers to use increased steam tube spacing, with consequent increased boiler costs.

SUMMARY OF THE INVENTION

I have discovered that a gas (such as the products of coal combustion) may be reacted with a solid material (such as limestone) in a fluid bed device with great efficiency if the gas as it enters the fluid bed is baffled to such an extent that the entering gas does not by impact upon the solid fracture it, if the solid is chosen so that it has an adequately large (by adequately large, I mean a microchip generation rate greater than the rate of buildup of coating, e.g., calcium sulfate) in-bed attrition rate, if there is included in the fluid bed enough material ("ballast") which does not break up easily so as to maintain desired bed height, if overflow means are provided to regulate the depth of the bed, so that attrition is by in-bed scrubbing movements to produce a constant shedding of very small particles ("microchips"), and if solid is added at a rate calculated to deal with the amount of reacting desired.

Particles formed by in-the-bed attrition are extremely fine (e.g., diameter 3 microns), produced by a surface rubbing effect, as noted in the prior art ("Experimental and Engineering support of the FBC program," D. L. Kearns, et al., Westinghouse Research Labs, Pittsburgh, PA, monthly report No. 14 to the U.S. E.P.A., contract 68-02-2132, January '77). (Gas emitted at non-baffled distributor holes is travelling fast enough to smash the entrained particles into each other, shattering them, to produce a wide range of particle sizes, many of which are too small to stay in the bed, but too large to effectively absorb $SO_2$ on their way out.)

DESCRIPTION OF THE PREFERRED EMBODIMENT

Figure 1:
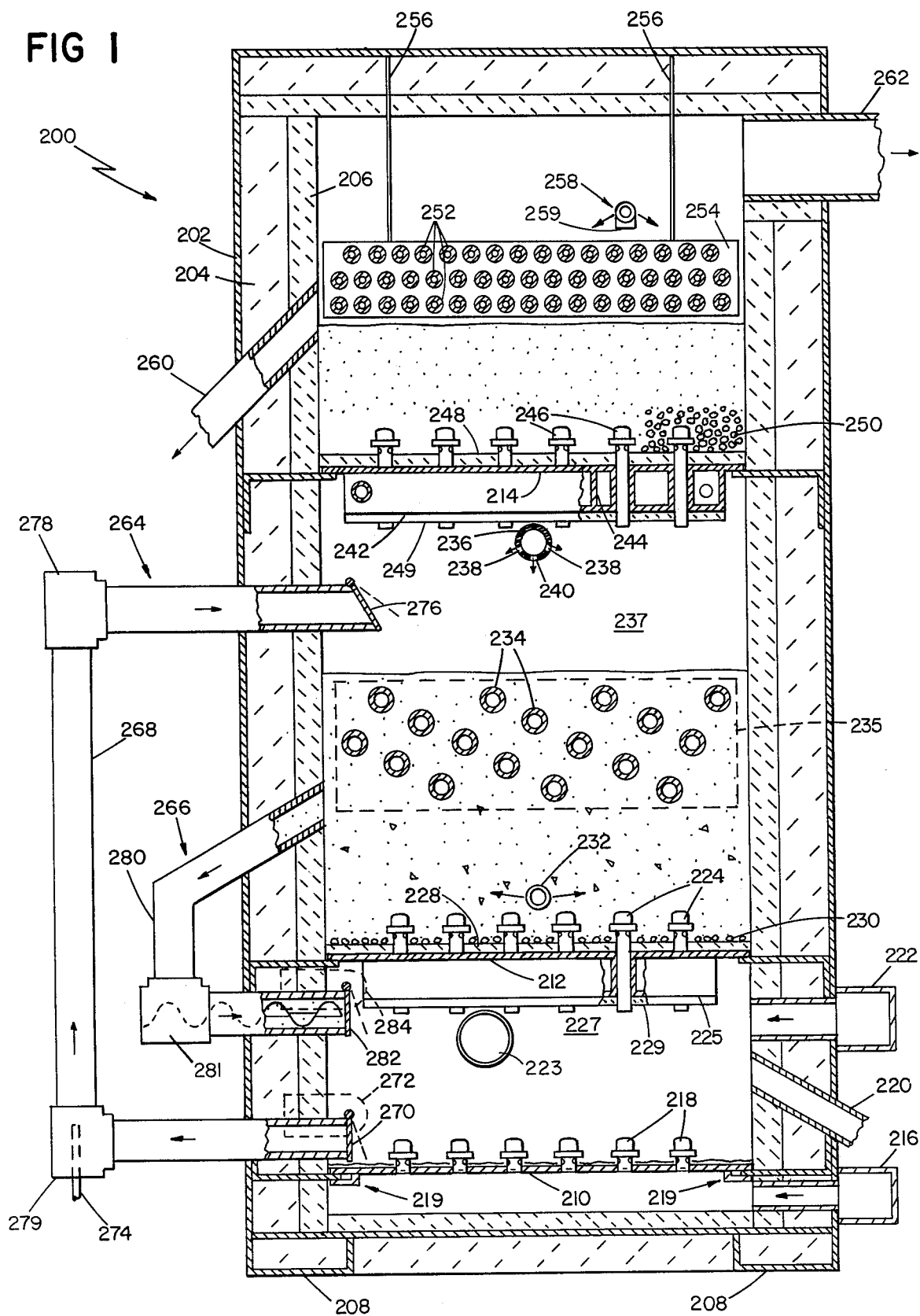
FIG. 1 is a diagrammatic view, mainly in section, of the most preferred embodiment of the invention.

We turn to description of the structure and then operation of the embodiment of FIG. 1.

Structure

There is shown in FIG. 1, diagrammatically, a threebed, all fluidized, combustor-desulfurizer, indicated generally at 200. A metal housing 202 surrounds layers 204 and 206 of lower and higher density refractory, respectively, to enclose the entire unit, which rests on supports 208. Metal distributor plates 210, 212, and 214 extend across the housing interior to define the bottoms, respectively, of three fluidized beds—a lower bed for storing sand, a middle combustor bed, and an upper desulfurizer bed.

The lower sand storage bed has under it a plenum fed by a windbox 216, through which fluidizing air enters the bed underneath distributor plate 210. A multiplicity of bubble caps 218 extend through plate 210 (over which extends an insulating board, not shown, to avoid hot spots), which is held in place by expandable joints 219. Extending through the housing wall above caps 218 is coarse-ash disposal pipe 220, which carries away to a baghouse hopper excess bed material.

The middle combustor bed has under it plenum 227 for supplying fluidizing combustion air to the middle bed. A multiplicity of bubble caps 224 extend through distributor plate 212 and water jacket 225, which serves to cool plate 212 to prevent it from buckling. A layer of insulation 228 rests on plate 212 surrounding each of caps 224, and a layer of stones 230 (actually coarse quartz in a mix of sizes from ⅜" to 1" in diameter) covers insulation 228. A similar layer of insulation 229 is secured (by means not shown) to the bottom of water jacket 225. The insulation serves to cut heat loss to the water in jacket 225. Above bubble caps 224 is coal feed pipe 232, which deposits coal at the bottom of the combustor bed, just above bubble caps 224. (Under-the-bed feeding of the coal allows the use of coal fines in the feed which would otherwise, i.e., with over-the-bed feeding, be blown out of the bed without combusting. Over-the-bed feeding would also make it difficult to operate the bed in any but its full-on position, i.e., with sand covering the top of steam tubes 234. At lower sand levels, with over-the-bed feeding, the coal would fall onto the steam tubes, and an agglomeration of unburned coal would soon build up. The inability to operate at reduced sand levels in the middle bed would eliminate use of the preferred turndown and startup methods, as will be described.)

Above pipe 232 and extending across the combustor bed are steam tubes 234, which are mounted at their ends in tube sheets 235 (one shown in broken lines) that define manifolds for introducing water into the tubes and removing water and steam from them. Tubes 234 are spaced and occupy 25% of the housing volume in the zone from the top row of tubes to the bottom row.

The upper desulfurizer bed has under it apertured secondary air pipe 236, which has two rows of holes 238 inclined downwardly at 30° for spreading out the secondary air beneath the upper bed and a third row of holes 240 at the bottom of the pipe for blowing out any particles that may have gotten into the pipe. Above pipe 236 is water jacket 242, which serves to cool distributor plate 214 to prevent it from buckling. Baffles 244 (one shown) serve to keep the velocity of the circulating cooling water high enough to avoid local hot spots that might cause damage. A multiplicity of bubble caps 246 extend through jacket 242 and plate 214. A layer of insulation 248 rests on plate 214 surrounding each of caps 246, and a layer of stones 250 (the same materials as stones 230) covers insulation 248 and caps 246. A similar layer of insulation 249 is secured to the bottom of water jacket 242. The insulation serves the same purposes as that for the middle bed distributor and water jacket. (The purpose of the stones 250 is to allow the gases emerging from bubble caps 246 to spread laterally over the distributor, allowing them to emerge into the upper bed at a sufficiently low velocity to avoid shattering the limestone particles.) Above the upper bed are three rows of tubes 252 to deflect particles back into the bed. Each tube in the middle row is positioned directly above a corresponding tube in the bottom row, but each of the tubes in the top row is positioned halfway between each adjacent pair of vertical pitch lines for the lower two rows. This arrangement avoids the possibility of a line of sight opening at any angle through the tubes so any particle that is ejected from the bed will solidly contact one of the tubes before leaving the bed, thereby reducing its speed and the likelihood of splashing into the freeboard. (A similar bank of tubes may usefully be placed above the second —i.e., combustion—bed.) Tubes 252 are supported near their ends and at spaced positions longitudinally thereof by apertured sheets 254 (only one shown), which are in turn supported from housing 202 by rods 256. Above tubes 252 extends limestone feed pipe 258, which deposits limestone in the desulfurizer bed to a level just above the top row of tubes 252. The limestone drops from the outlet tee 259 of pipe 258 through a gap (not shown) in the assembly of tubes 252; without this gap, some limestone particles may be too large to pass through the tube assembly. Limestone downcomer 260 cooperates with a limestone pot (not shown in FIG. 3 but shown in FIG. 8) to maintain the level of limestone just above tubes 252 and to carry away spent limestone. Hot desulfurized gases leave through smoke pipe 262, through which they can be transported through a boiler to which they give up their remaining heat, then to a baghouse for removal of any ash or other particulates that may escape from the upper bed, and finally to a stack.

Upcomer assembly 264 and downcomer assembly 266 permit bed material to be moved from the lower bed to the middle bed and vice versa, for preheating and turndown (both to be discussed in more detail subsequently). Upcomer assembly 264 includes upcomer piping 268, which, when door 270 is opened by actuator 272 (shown in broken lines because it is mounted on the exterior of housing 202), permits bed material to be taken from the lower bed and blown by air under pressure from tube 274 into the middle bed through door 276, which is held shut by gravity to prevent filling up of the upcomer piping with bed material when it is not in use but which opens in response to bed material forced up from the lower bed. The normal bed material level for operating the combustor at 100% of capacity is just above the topmost steam tubes, as shown in FIG. 1. Tee fittings 278 and 279 are used when the bed material makes a sharp turn, to reduce wear on the piping there.

Downcomer assembly 266 includes downcomer piping 280, which, when door 282 is opened by actuator 284 (shown in broken lines because it is mounted on the exterior of the housing), permits bed material that has entered the piping from the middle bed to be fed with a feed screw into the lower bed. For normal operation downcomer piping 280 should be filled with bed material to act as a pressure seal so that air from plenum 227 is not able to keep bed material from coming down the piping. Tee fitting 281 is positioned where the bed material makes a sharp turn.

Figure 2:
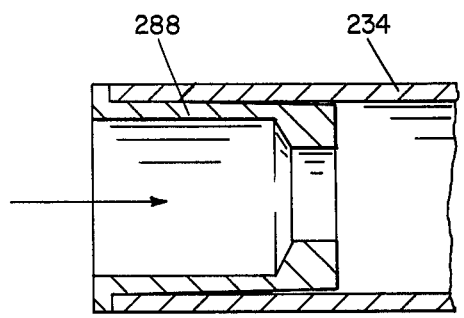
FIG. 2 is a sectional view of a nozzle and portion of a steam tube used in the embodiment of FIG. 1.

Turning to particular details of the structure of FIG. 1, each boiler tube 234 has a nozzle 288 (FIG. 2) fitted into its end connected to the water inlet manifold. The purpose of the nozzle is to assure that water flows into and through each steam tube and does not simply flow through the lowest tubes because the hydrostatic pressure is greatest for them. If water does not flow through a tube, the tube will likely overheat. With the nozzle, the primary resistance to flow is the pressure drop through the nozzle, which is the same for all the tubes, so that the lower tubes no longer provide a substantially easier flow path.

Figure 3:
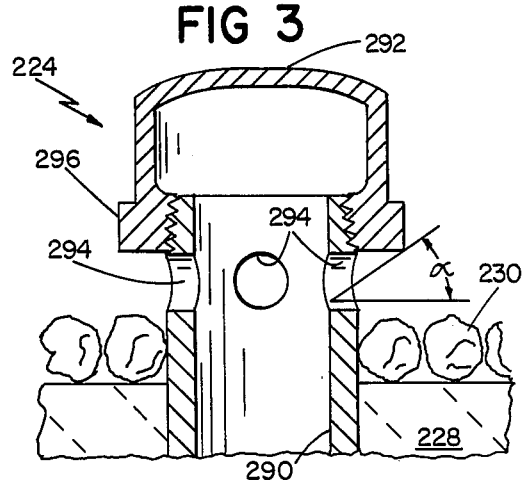
FIG. 3 is a sectional view of a portion of a bubble cap installed in the middle distributor assembly of the embodiment of FIG. 1.
Figure 4:
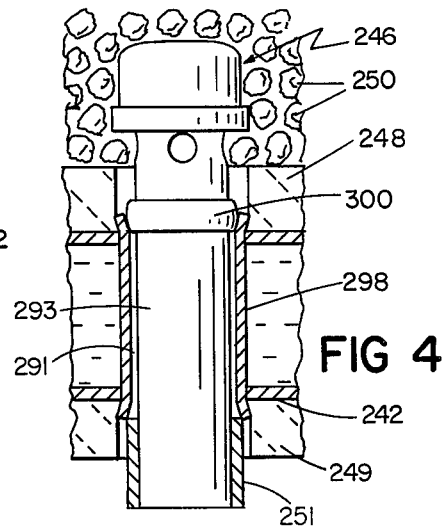
FIG. 4 is a side elevation view, partly in section, of a bubble cap and portion of the upper distributor assembly of the embodiment of FIG. 1.

FIG. 3 shows a bubble cap 224 in middle distributor plate 212. Bubble cap 224 includes nipple 290 and cap 292. Nipple 290 is fitted through a hole in plate 212 and through a tube in water jacket 225 (not shown in FIG. 3; see FIG. 4 for the same construction for a bubble cap in the upper bed). Just below cap 292 are four radially spaced holes 294 (three are shown) in nipple 290. Cap 292 has an annular shoulder 296, which acts as an umbrella over holes 294 to prevent sand (or, in the upper bed, limestone and sand) from falling into the holes and "weeping" onto the bed below when the burner is turned off. Actually, weeping is much less of a problem in the upper bed because stones 250 protect against the weeping of sand and limestone. The diameter of shoulder 296 is chosen so that angle $\alpha$ measured from the lower outer edge of the shoulder to the inside bottom surface of one of holes 294 (FIG. 3) is smaller than the angle of repose of the sand (or limestone), which is the angle that a pile of a particular material makes with the base on which it rests. The angle of repose for the sand used in the unit of FIG. 1 is 37°. Angle $\alpha$ is actually computed by first subtracting from the diameter of hole 294 the particle diameter and then choosing a shoulder diameter that, when a line is drawn from the shoulder edge to the bottom of hole 294 less the particle diameter (as indicated in FIG. 3), will yield an angle smaller than the angle of repose. Angle $\alpha$ can be computed in this way because it has been found that a single layer of particles will not fall into one of the holes.

Bubble caps 218 and 246 are similar to bubble caps 224 except for size. All the bubble caps are removable from their respective distributor plates, to allow easy replacement. Each upper bed bubble cap 246 is fitted through a tube 298 (FIG. 4) in water jacket 242 and wedged there by ferrule 300. Half-coupling 251 is threaded to the bottom of nipple 290 to secure it in the hole. Except for ferrule 300 and half-coupling 251, bubble cap 246 is kept relatively isolated from tube 298 and jacket 242 to permit the bubble cap to become hotter than the distributor, to burn off any tars or other volatiles that may collect on the bubble caps during start-up. Because this volatile-burnoff function shortens the life of the bubble caps, the easy replacement of the bubble caps without having to replace the distributor is a significant advantage.

Figure 5:
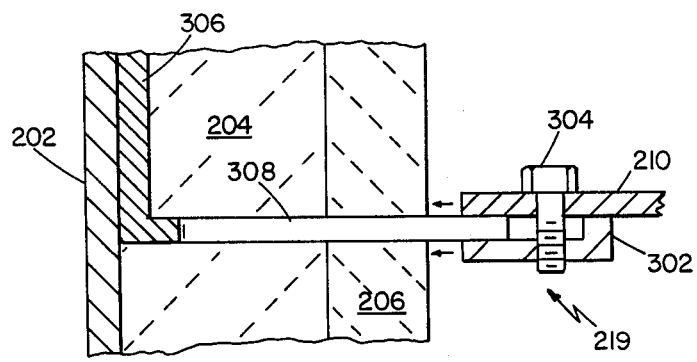
FIG. 5 is a sectional view of an expandable joint used in mounting the lower distributor plate in the embodiment of FIG. 1.

FIG. 5 shows an expandable joint 219 for the lower distributor plate 210. Joint 219 includes L-shaped member 302, which is loosely bolted to the outer underside of plate 210 by bolts 304 (one shown). Fastened to housing 202 and extending inwardly through refractory layers 204 and 206 into the space between plate 210 and member 302 is angle iron 306. Angle iron 306 extends the length of plate 210 in the direction coming out of the plane of the paper, as does member 302. However, spaced sawcuts 308 (one shown in FIG. 5) are made in angle iron 306 to permit lateral expansion of the angle iron in response to heating, particularly at the outer edge of the angle iron. When plate 210 expands in the direction of the arrows in FIG. 5 during burner operation, room is provided for that expansion because the outer edge of angle iron 306 is spaced from bolt 304 and the outer edges of plate 210 and member 302 are correspondingly spaced from refractory 206. Joints 219 thus prevent plate 210 from buckling. Bolt 304 fastens plate 210 and member 302 tightly enough to minimize leakage of gases through the joint but loosely enough to allow free lateral movement of the plate and L-member with respect to the angle iron. Joints 219 secure distributor plate 210 to housing 202 on at least three sides. Either a further joint 219 or a groove in the housing wall could be provided on the fourth side.

Figure 6:
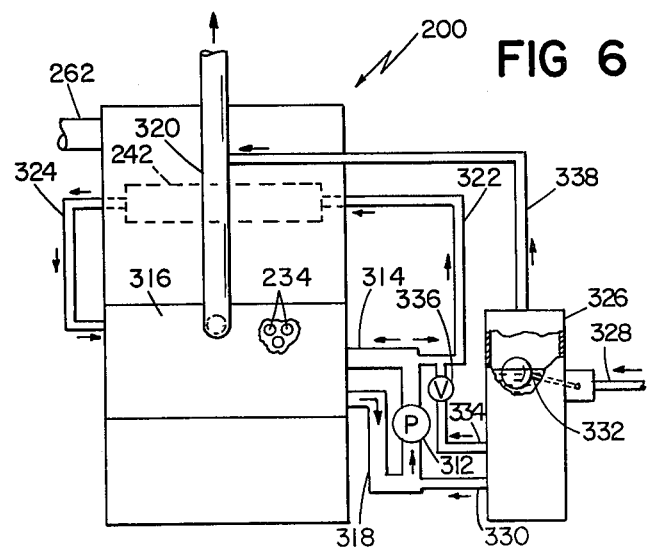
FIG. 6 is a diagrammatic view of the water circulation system of the embodiment of FIG. 1.

FIG. 6 shows a portion of the water circulation system for combustor-desulfurizer 200. Feed water enters the system at return pipe 328 and is pumped by circulator pump 312 through piping 314 into the inlet manifold (not shown because it is on the opposite side of the burner from that shown in FIG. 6) for steam tubes 234, through steam tubes 234, through the outlet manifold 316 and back out piping 318. Steam is separated from water in outlet manifold 316 and leaves through supply pipe 320. Piping 322 carries a portion of the water from the circulator pump to water jacket 242 to cool the upper distributor plate. Water leaves jacket 242 through piping 324, through which it is carried to outlet manifold 316 and from there back to piping 318. Although the piping is not shown, a similar arrangement exists for water jacket 225 (not shown). Steam drum 326, a separate unit positioned alongside of combustor-desulfurizer 200, supplies water to the system to make up for the water that is lost by steam generation in the combustor and to make sure that there is always enough water for pump 312. Steam drum 326 includes feedwater pipe 328 and outlet pipe 330, the latter for supplying water to pump 312. Float valve assembly 332 allows additional water to enter the steam drum through pipe 328 whenever the water in the drum is below a certain level. Piping 334 is used to flood the steam tubes 234 with water if there is an emergency shutdown, to prevent the tubes from overheating. Solenoid valve 336 automatically turns on this water during such a shutdown. Piping 338 vents the steam drum to supply pipe 320 to avoid steam pressure buildup or a steam vacuum in steam drum 326. The water circuit for combustor-desulfurizer 200 is in parallel with the water circuit of the boiler (not shown), as follows. The pipe bringing return water to pipe 328 is also connected to the water inlet of the boiler, and the steam line to the load that is connected to pipe 320, is also connected to the steam outlet of the boiler.

Figure 7:
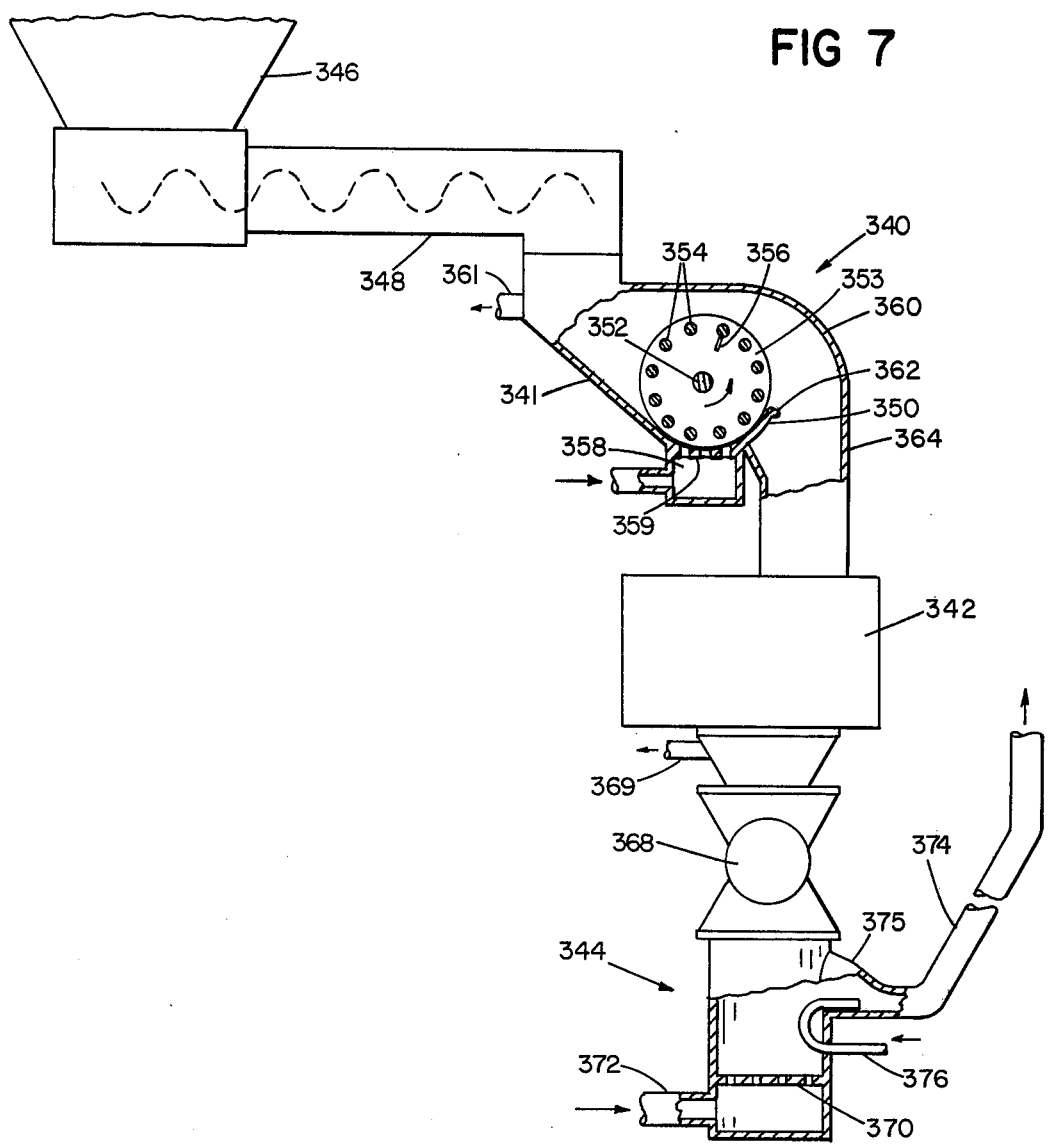
FIG. 7 is a side elevation view, partly in section and partly broken away, of the apparatus for drying and crushing coal and transporting it to the embodiment of FIG. 1.

Turning to the system for feeding coal to combustor-desulfurizer 200, FIG. 7 shows variable-speed screw feeder 348, coal drier 340, crusher 342, rotary air lock 368 and coal pot 344. Coal from coal bin 346 passes through screw feeder 348 and enters drier 340 through chute 341, from which it falls into trough 350, partially semicircular in cross section, in which is positioned revolving shaft 352 carrying at each end a wheel 353 (one shown) between the two of which extend bars 354. One of the bars 354 carries smaller transverse pins 356 (1" in length), which are spaced with $\frac{1}{4}$" gaps therebetween to rake along larger lumps of coal but not to catch smaller pieces of coal and the fines. At the base of trough 350 is fitted hot air duct 358, which introduces hot air (500°–700° F.) into trough 350 through perforated distributor plate 359 to fluidize the smaller particles and heat by jet impingement the larger ones. This air is first heated by passing it through a coil (not shown) in the combustion bed. Enclosing trough 350 is cover 360. Vent 361 permits hot air and any gases emitted by the coal to be vented. The revolving assembly promotes the drying of coarse lumps of coal, when only large sizes are being fed (e.g., stoker coal, sized $1\frac{1}{4} \times \frac{1}{4}$") by stirring the lumps, thereby eliminating pockets of moisture that might otherwise be left between coal pieces. When the drier is being used to dry coal containing both coarse and fine coal (e.g., nut and slack coal, sized $1\frac{1}{2} \times 28$ mesh), the raking motion of pins 356 removes coarse lumps, these lumps not requiring as much drying as the fines, thus allowing the remaining coal to be dried in the fluidized state. Coal moistures of up to 15% can be handled by the drier, while using air that is safely below the coal gas explosion point, because of the relatively long residence time (typically 15 seconds) of the coal in the trough, which permits the drying air access to a relatively large amount of coal surface, thereby promoting the transfer of heat to the coal. At the side of trough 350 opposite screw feeder 348 is outlet lip 362, which is at the end of a radius 15° below a horizontal radius, and directs dried coal to piping 364 and from there to crusher 342 (a crusher designed to crush the coal to a particle diameter of $95\% - \frac{1}{2}$", $50\% + 8$ mesh) and into rotary air lock 368. Vent 369 prevents pressure buildup upstream of the air lock, and is vented to atmosphere.

Pockets of crushed coal are then dumped from air lock 368 into coal pot 344. Coal pot 344 has mounted in it a perforated distributor plate 370 below which air inlet pipe 372 enters the pot to direct fluidizing air through plate 370. Coal outlet pipe 374 extends from the pot above plate 370, and is connected to the pot by reducer 375. Blast air tube 376 is directed into reducer 375 to assist in carrying coal out through pipe 374 pneumatically to coal feed pipe 232 (FIG. 1) of combustor-desulfurizer 200.

The purpose of the coal pot is to smooth out the fluctuations in the coal feed rate that would otherwise occur when the rotary air valve empties each pocket. Such fluctuations increase the likelihood of a plug in the coal feed line, thereby reducing the system's reliability, and also diminishing its ability to transport relatively large coal sizes (of up to ½"), in the 1¼" diameter pipe 374 without plugging; a larger pipe 374 might thus be needed to accommodate such lumps. But a larger coal pipe requires greater amounts of pneumatic transport air, which in turn adversely affects the combustor's operation by increasing the likelihood of blowouts through the bed when the bed height is at its minimum depth. These blowouts carry with them the coal fines (<28 mesh) in the coal supply, and adversely affect the burner's combustion efficiency. Fluctuations in the coal outlet flow rate are damped as follows. The coal pot is sized to permit vigorous fluidization; i.e., the velocity of the fluidizing air through the pot is designed to be at least three times the miminum fluidization velocity of the coal. This causes coal particles to be flung into the space above the coal pot's bed level; those of the particles that are flung into the vicinity of the reducer 375 are drawn into the reducer and blown into the coal pipe 374 and to burner-desulfurizer 200. Without fluidization, the coal feed rate would change appreciably with the slight changes in bed height that inevitably occur with the surges of incoming material, but with fluidization, the feed rate to the reducer is seen to depend on the splashing from the bed, which is independent of the surges. The jet blast tube 376 assists in providing the smoothness of the flow by eliminating any possible buildups that might otherwise occur in the reducer 375.

The coal pot may also be used to split the main coal stream into a number of smaller, equal feed streams, each of which feeds an equally-sized bed area. Such stream splitting is required for fluid bed combustors whose bed area exceeds 10 square feet. The coal pot performs the stream splitting function by placing the required number of outlets (one per 10 square feet) at the perimeter of the pot, each identical to the assembly of reducer 375, pipe 374, and blast tube 376.

(An even more preferred design would move rotary air lock 368 between feed screw 348 and drier 340, allowing heated air leaving the drier at vent 361 to be used as coal transport air, entering the coal pot at pipe 372 before driving the coal to the fluid bed combustor. This eliminates the thermal loss and fuel loss associated with venting the drier's exhaust gases to atmosphere, and eliminates the need for any particulate collector system that would otherwise be required with an atmospheric vent system.)

Figure 8:
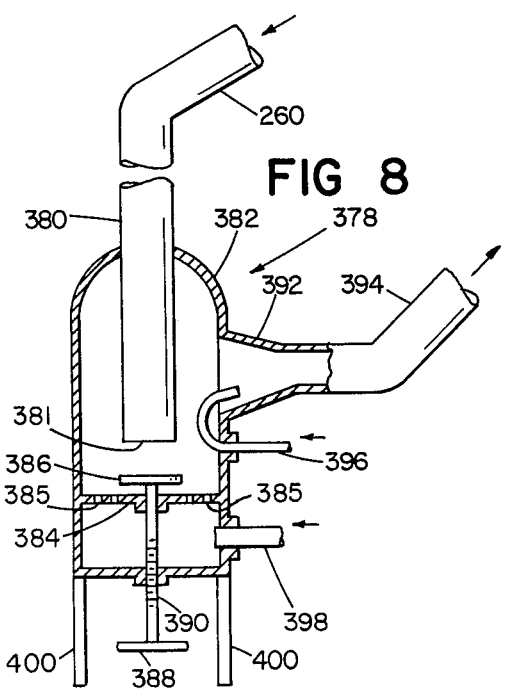
FIG. 8 is a side elevation view, mainly in section, of a limestone pot for removing limestone from the embodiment of FIG. 1.

FIG. 8 shows limestone pot 378, which is similar to coal pot 344. Pot 378 is connected to limestone downcomer 260 through standpipe 380, which extends downwardly centrally within pot housing 382. Also within housing 382 is a perforated distributor plate 384 positioned below the mouth of the standpipe 380. Above plate 384 is orifice plate 386, which is vertically adjustable by handle 388 and threaded shaft 390 to adjust the size of the opening from standpipe 380 into housing 382. At a level above mouth 381 of standpipe 380 is outlet fitting 392, which connects housing 382 to limestone disposal pipe 394. Blast air tube 396 is directed to blow air into outlet fitting 392 to assist in pneumatically transporting spent limestone through pipe 394 to baghouse hopper (not shown). Below plate 384 is air inlet pipe 398, which sends fluidizing air through plate 384. Housing 382 rests on supports 400. The limestone pot has a similar function as the coal pot, i.e., to transport solids in a jamresistant fashion and in the smallest practical pipe. It also serves to cool the sorbent from its bed temperature (ca. 1550 F.) to one low enough (under 400 F.) to safely transport the spent sorbent to the baghouse. It also serves to use the dipleg 380 feeding it as a pressure seal, thereby allowing the pressure in the limestone pot to build up sufficiently (typically to 1 psi) to transport the spent sorbent to the baghouse hopper, thus eliminating the need for a mechanical seal in the high-temperature dipleg. (According to Walker et al., *Combustion*, February '79, p. 31, no device for performing these functions, referred to as a bed letdown cooler, is currently available.)

Dimensions and other specifications in the embodiment shown have been selected to give an energy input of 500,000 BTU/hour/sq. ft., and are as follows. Steam pressure is 15 psig or less. The horizontal area of middle distributor plate 210 is 20 square feet (3 ft., 2" by 6 ft., 4"), for 10,000,000 BTU/hour energy input. The lower bed when filled is 7" deep (when settled) and uses sand with an average particle size of 20 mesh (850μ). The middle bed varies from a depth of 6" to 11.5" and uses the same size sand as the lower bed. The upper bed is 6" deep and uses 90% 6 mesh, 50% +10 mesh sand and −⅜+5/16 limestone chips. The limestone is type 1360 that is available from the Monmouth Stone Co., Monmouth, Ill. The coal is Peggs Run bituminous stoker coal, sized 1¼"×¼", containing 3¼% sulfur and having 13,750 BTU/lb., available from Peggs Run Coal Co., Shippingport, Pa. The distance between the top of bubble caps 224 and the bottom of steam tubes 234 is six inches. (This permits the burner to operate without blowout at the coal feed pipe. Blowout occurs in this embodiment when the bed material in the middle bed is less than three inches deep, as measured from the top of bubble caps 224. The provision to make the middle bed six inches deep, rather than the minimum of three inches, is to provide a safety factor against blowout due to the inadvertent loss of bed material during operation.)

The middle bed freeboard is 30", and the upper bed has a freeboard of 18". These freeboard dimensions were chosen to prevent significant loss of sand and sorbent, respectively. The overall height of combustor-desulfurizer 200 is 100". Bubble caps 218, 224, and 246 are all on 3" centers to give 16 per square foot. They are positioned closer to the walls than shown in FIG. 3, for uniform fluidization throughout the bed. Nipples for the bubble caps on the upper bed are 1" (IPS) and the caps are 1" NPT; each is ½" in the two lower beds. Shoulder 296 is 1.9" in diameter. The radial gap 291, between the nipple 293 of the upper bed and the surrounding tube 298 is approximately 0.1 inch. Holes 294 in the middle distributor are 0.192" in diameter; the equivalent holes in the upper distributor are 0.400" in diameter. The quartz rocks 250 are piled to a depth of two inches over the top of caps 246. Although only one coal feed pipe 232 is shown, two are actually used, each centrally positioned over a bed area of ten square feet. Feed pipe 232 is 1¼" IPS, steam tubes 234 are 1½" OD, and secondary air pipes 236 (only one shown) are 4" OD. Holes 238 are ½" along the two sides, on 7" centers, and holes 240 are ¼" on 3.5" centers. The steam tubes are spaced with a 6.5" pitch in the horizontal direction, and a 2.8" pitch in a direction 30° from the horizontal. Limestone feed pipe 258 is 1½" OD. Tubes 252 are ¾" OD. The centerlines of tubes 252 are spaced 1⅜" apart, in rows whose centerlines are also 1⅜" apart. Upcomer piping 268, downcomer piping 280, and limestone downcomer 260 are 2" IPS. The turndown ratio is 30 to 1. Preheater 223 is a propane-fired duct heater and has 15% of the heating capacity of combustor-desulfurizer 200. Refractory 204 has a density of 50 lbs./cu.ft. and is 2.5" thick, and refractory 206 has a density of 140 lbs./cu.ft. and is 1½" thick. Regarding the coal pot, air inlet pipe 372 is 1½" IPS, blast air tube 376 is a ⅜" tube, outlet fitting 375 is a 2½"×1¼" eccentric reducer. As to the limestone pot, air inlet pipe 398 is 1½" IPS, blast air tube 396 is a ⅜" tube, outlet fitting 392 is a 2½"×1½" eccentric reducer, and outlet pipe 394 is 1½" IPS.

As to materials, upcomer piping 268, downcomer piping 280, limestone downcomer 260, and wavebreaker tubes 252 are made of 316 stainless steel. The secondary air pipes 236, coal feed pipe 232, and the nipples for the bubble caps are made of 304 stainless steel. Housing 202, boiler tubes 234, water jackets 225 and 242, all three distributor plates, coal pot 344, and limestone pot 378 are made of carbon steel. Caps for the bubble caps are made of 304 stainless steel. Blast air tubes 376 and 396 are made of copper.

OPERATION

Sand is supplied to fill the middle bed to a depth of about 11.5". Type 1360 limestone crushed to a mean particle diameter of 20 mesh (850μ) is supplied through feedpipe 258 to fill the upper bed to a depth of about 6".

Start-up of a cold combustor requires preheating as follows. Fluidizing air is supplied from a blower (not shown) through windbox 216, and the middle bed, assuming that it has been previously filled with bed material, is emptied via downcomer assembly 266 until the bed level is below the inlet to the downcomer so that boiler tubes 234 are no longer covered with bed material (remaining material is about 6" deep). Air from windbox 216 passing through bubble caps 218 acts to spread out the bed material deposited by the downcomer, and directed through the storage bed when either the upcomer or downcomer is in operation, to keep the lower bed material uniformly spread out. When the bed level in the middle bed is down to 6 inches, the fluidizing air is turned off. The water circulator pump 312 is turned on. Preheater 223, which is spaced below distributor 212 to provide uniform heating of the middle bed, is then turned on. Flames generated in the preheat burner are cooled to approximately 1700° F. by secondary air before they emerge from the burner, to avoid overheating bubble caps 224. Hot gases emerging from the preheat burner 223 heat the material in the middle bed to about 1000° F. in about an hour, following which coal is added for a minute with fluidization (to assist further preheating), following which preheating is resumed 15 minutes or so, until the bed reaches about 1350° Fahrenheit. Because the boiler tubes are not in contact with material in the middle bed, they do not draw heat from the bed material, and because the bed material is heated when it is not being fluidized (i.e., as a fixed bed), the surface area for heat loss from the bed material is reduced, so that the bed material can be heated with a fairly small preheater.

When the middle bed has reached 1350° F., the propanefired preheater is turned off. Fluidizing combustion air from the blower is supplied through windbox 222 and through bubble caps 224 to fluidize the middle bed. The fluidizing combustion air is controlled by a valve (not shown) to provide an airflow of 110 scfm per square foot of bed area, which produces a superficial velocity of approximately 7½ ft/sec. in the upper bed at 1550° F. The coal feed screw 348 and transport air compressor (not shown) feeding air to the coal pot at inlet pipe 372, and to the limestone rotary feeder outlet (not shown) are then started, and coal is fed from bin 346 through screw feeder 348, drier 340, crusher 342, rotary air lock 368, coal pot 344, and to the middle bed through pipe 374. The coal mixes with the hot bed material and burns. Fluidization causes the coal to be distributed away from the coal feed pipe and become mixed throughout the bed. The heat released from the burning coal heats the bed, until the middle-bed approaches the desired temperature of 1800° F. (A lower setting may be required to avoid clinkering when coals with low-ash-fusion-points are used, and a higher setting may be used with hard-to-burn, unreactive fuels with high-ash-fusion-points). The middle bed is kept from reaching a hotter temperature in part by the cooling effects of the steam tubes 234, which are being splashed by the fluidized bed material, and in part by the effect of the control thermocouple in the middle bed, which serves to control the middle-bed's temperature by adjusting the speed of the screw feeder 348, thereby affecting the fuel/air ratio in the middle bed. Typically the burner will be operating at an excess air of 100% at this condition.

Simultaneously with the coal feed, the limestone feed to the upper bed is started, at a predetermined Ca/S ratio, as explained hereinafter. The limestone, −⅝+5/16" chips, flow from a limestone bin (not shown) through the rotary feeder and are pneumatically conveyed to the upper bed through pipe 258. The rate at which the limestone is fed is determined by the speed of the limestone rotary feeder, whose speed is slaved to the coal screw feeder 348 in order to provide the predetermined Ca/S ratio.

Gases emerging from the middle bed pass through bubble caps 246 and the upper bed, and leave combustor-desulfurizer 200 at pipe 262. As the temperature of the upper bed reaches the upper-bed set point of 1550° F., which is the temperature at which desulfurization efficiency is best, a thermocouple in the upper bed causes a modulating valve (not shown) at the combustion-air blower to open, causing secondary air to flow into the middle-bed freeboard 237 through secondary air pipe 236. The secondary air flow rate is modulated continuously to maintain the upper-bed temperature at 1550° F.

Solids too small to remain in the middle bed, including ash, sorbent, and small particles of carbon, are blown through bubble caps 246 and trapped in the upper bed, where combustion of the small bits of carbon is continued for a few moments, before being blown from the upper bed and out of the burner at duct 262.

Particles too coarse to blow out of the upper bed will cause the upper bed level to rise, causing excess material to be removed at limestone overflow pipe 260.

If, after the bed has reached its desired bed temperature, the system steam pressure is beneath the required amount, the burner automatically arranges to increase its heat output, as follows. Bed material from the lower bed is blown into the middle bed, by operating the upcomer 264. This slowly increases the contact of the bed material with steam tubes 234, thus increasing the heat loss from the bed, causing the middle bed temperature to drop momentarily. The middle-bed temperature sensor causes the coal feed screw 348 to increase the coal feed rate, in order to maintain the feed temperature at its former set point. This process continues, whereby the bed level is increased along with the coal feed rate, until the steam tubes are completely covered. At this point, approximately ⅔ of the heat of combustion is removed at the steam tubes 234, with the remaining heat removed at the boiler, and the excess air at the middle bed is 5 to 30%. The upcomer must blow fed material slowly enough to avoid quenching of the middle bed, i.e., to allow the coal feed rate to increase fast enough to overcome the cooling effects of the incoming material.

The burner-desulfurizer 200 continues to operate at this, its maximum, capacity, until the steam pressure reaches a set point P2, causing downcomer 266 to be activated and the material in the middle bed to be transferred slowly to the storage bed, thereby reducing the heat transfer to steam tubes 234 and eventually by response to the middle bed thermocouple, the coal feed rate. Reduced heat transfer to steam tubes 234 in turn causes the steam pressure to drop, eventually, below set point P2. At this, downcomer 266 is inactivated. Under most circumstances, the burner is now at equilibrium: the coal feed rate, bed depth, and steam output all remain constant.

Under some circumstances, as for example when there is a large amount of stored steam in the system, so that the steam pressure changes very slowly in response to variations of the firing rate, the downcomer may have been activated too long, causing too much bed material to be transferred to the storage bed, and eventually causing the steam pressure to fall below a lower set point P1, which is less than P2. At this, the upcomer 264 is activated until, eventually, the middle-bed level is such that the steam output matches the steam requirement, and the steam pressure remains between P1 and P2. At this condition, again, no further adjustments to the middle-bed level are required, as long as the steam demand remains constant. If the steam demand changes, however, causing the steam pressure to pass either of the set points, the upcomer or downcomer are activated until the system is again in equilibrium. In this manner, the burner-desulfurizer is continuously modulated from full capacity to about 50% of full capacity. Operation in this manner is called the modulating mode.

If the steam demand drops below the 50% level, a further reduction of the material depth in the middle bed would be incapable of producing further reductions in steam output and, in fact, cannot be achieved insofar as the entrance of downcomer 266 prevents removal of middle-bed material below the six inch depth. In this case, the steam pressure continues to rise, eventually exceeding set point P4 (higher than P2), which causes the burner-desulfurizer 200 to be shut off. Shutoff consists of turning off coal-feeder 348, drier 340, crusher 342, rotary air lock 368, and the limestone feeder. After 15 seconds, enough time to clear away the solids in coal pipe 374 and limestone pipe 258, the transport air compressor and combustion air blower are turned off. The burner-desulfurizer 200 is left off until the steam pressure drops below set point P3 (between P2 and P4), where it is turned on, in the reverse sequence from which it was turned off. As long as steam capacity is below 50% of rated capacity, the burner-desulfurizer 200 will continue to cycle on and off as steam pressure fluctuates between P3 and P4. This mode of operation is called the cycling mode. In the cycling mode, the burner-desulfurizer may be left off for periods of up to an hour, before it cools below the temperature at which coal is readily ignited. About three minutes' operation is required to heat the bed back to its set point, at a coal feed rate of two-thirds of the full-capacity rate. By this means, the overall turndown of 30-to-1 is achieved. If the stream demand averages less than 1/30 of full capacity for an hour or more, the middle-bed temperature sensor observes that the bed is below the reignition point, and prevents the feeding of coal to the unit until the preheater has been used to return the bed to its minimum ignition temperature. Greater turndown than 30-to-1 could be achieved, if necessary, by the use of more extensive insulation all around the middle bed.

An alternative mode of operation in the modulating mode causes the combustion air flow to be slaved to the coal feed rate. This increases the system's thermal efficiency by minimizing the excess air, and thereby the thermal stack losses, but requires a more complex control than does the previously described method by which the airflow remains constant throughout.

Another mode of operation, called the low-nitric-oxide mode, arranges to have the combustion bed operated substoichiometrically (typically at an equivalence ratio of 0.85), while the upper bed is operated at a slight excess-air level (typically, 3%), and to have tertiary air added above the desulfurizing bed through an aerodynamic mixer (not shown) to create an atmosphere containing 20–30% air at the burner-desulfurizer's outlet. The freeboard above the upper bed will need to be increased, to allow unburned hydrocarbons, including carbon monoxide, to be adequately combusted. The purpose of this method is to minimize the nitric oxide (NO) emissions from the burner, while still achieving good combustion efficiency and pollution characteristics with regard to $SO_2$, CO, and other hydrocarbons. Operation of the combustion bed at substoichiometric conditions reduces the rate of combustion of the coal particles, thereby increasing the carbon content of both the combustion bed and the desulfurizing bed. Previous investigators (Beer, et al. "NO Reduction by Char in Fluidized Combustion", *Proc. of the 5th Conf. on Fluidized Bed Combustion,* Washington, D.C., December '77) have shown that the presence of small amounts of carbon in a bed is sufficient to drastically reduce the NO level emitted from a fluid bed. Other investigators (Horio, et al., "A Model Study for the Development of Low $NO_x$ Fluidized-Bed Coal Combustors", *Proc. of the 5th Conf. on Fluidized Bed Combustion,* Washington, D.C., December '77) have taught that a two-stage fluidized bed combustor is particularly effective at mixing the NO with the carbon, thereby chemically reducing the NO to form molecular nitrogen. The oxygen level in the upper bed must be optimized to meet both the requirements of desulfurization, which is favored by a high-oxygen atmosphere, and of NO reduction, which is favored by a low-oxygen atmosphere, although the presence of small amounts of oxygen (typically, 3% excess air), are acceptable to the NO reduction process.

Since it is impossible to operate ths system with low excess air in the cycling mode, the attainment of low NO levels by this method is not achievable in the cycling mode.

Periodically, depending on the rate of depletion or accumulation of solids in the system, various parts of the system must be checked for the amount of solids inventory, and appropriate measures must be taken, as follows:

The accumulation of coarse particles in the middle bed is not normally observed, unless large particles of mineral matter are fed with the coal. In such a case, the burner is periodically turned down, whereby the downcomer 266 is activated, and all bed material in excess of 6" in the upper bed is blown into the lower bed, and all material in excess of 7" in the lower bed is then removed at overflow 220. The coarse material may be screened out, and the remaining material be returned to the bed, or the entire excess may be dumped into the baghouse hopper for disposal. Use of the storage bed as a removal site permits the excess material to be cooled from the bed temperature (about 1800° F.) to a safe temperature for transporting and storage (under 400° F.) by allowing fluidizing air to enter the burner-desulfurizer at windbox 216 until the lower bed is at the low temperature, at which point the valve is overflow pipe 220 is opened.

After completion of the excess-material removal, the burner resumes its normal operation.

In the upper bed, whenever the bed height is observed to drop below the minimum allowable level of four inches, the bed is filled to the optimum depth of six inches by the addition of coarse sand, sized 90% minus 6 mesh, 50% plus 10 mesh. Also, if the upper bed height is observed to exceed a maximum allowable depth of nine inches, transport air is allowed to enter the limestone pot 378 at pipe 398, thereby fluidizing the solids resting on distributor plate 384, permitting the material which has entered the limestone pot to be blown out of the limestone pot and into the baghouse. Orifice 386 is adjusted to restrict the rate at which bed material is allowed to enter the limestone pot, thereby preventing the flow of excessively hot materials from the limestone pot, and also preventing the buildup of excessive pressures in the limestone pot that would destroy the pressure sealing effect of the material located in the downcomer 260 and standpipe 380. When the upper bed depth has been reduced to its desired height, fluidizing air to the limestone pot is turned off, and the standpipe 380, as well as downcomer 260, are allowed to remain full, or to be refilled, after which no further material is removed from the upper bed, until the cycle needs to be repeated.

Other areas requiring periodic attention include the bags in the baghouse, which must be cleaned of dust accumulations by any one of several standard procedures for cleaning the bags. Preferably, the burner is shut down momentarily during baghouse cleaning; even at the full-bed conditions, baghouse cleanup can be accomplished before the middle bed has been cooled below the coal ignition point. Also, periodically, the baghouse hopper, where residue is collected, must be emptied, and settling chambers within the boiler may have to be cleaned out.

Shutdown of the burner for prolonged periods, i.e., more than an hour, should be started with the middlebed operating at its set-point temperature, whereby the coal feed screw is simply turned off, allowing the coal in the bed to burn off. Failure to burn off the coal may result in clinkering upon subsequent restart. The combustion air and the circulating water pump 312 are left on until the burner is cool enough to avoid warping steam tubes 234 when the coolant flows are turned off.

The calcium/sulfur ratio must be made sufficiently large, by proper adjustment of the limestone feed rate, to produce at least enough microchips, (measured in mass per unit time) to absorb all of the $SO_2$ generated by combustion; otherwise, the bed wilts. Wilting is said to occur when sulfation hardening of the particles occurs at a faster rate than attrition can wear away the particles' surfaces; the sulfate hardening causes a reduction in the attrition rate, which causes more sulfate hardening, creating a cycle that ends only when attrition virtually stops. Once a bed has wilted, its scrubbing efficiency is greatly reduced, unless the Ca/S ratio is greatly increased.

Once a bed has wilted, it is best to replace it with a fresh bed of sorbent, and start again with a higher Ca/S feed ratio.

The onset of wilting is accompanied by a reduction of the density of the cloud of microchips at the bed's outlet, and a simultaneous increase in the rate of buildup of the upper bed's depth. The observation of either effect may be used to prevent wilting by increasing the sorbent feed rate. Alternatively, the Ca/S may merely be set at a sufficiently high rate to provide a safe margin beyond the minimum requirement, thereby avoiding wilting without any measurement of the attrition rate.

Ideally, very soft sorbents are employed, so that none of the particles ever become sulfate hardened, instead continuing to attrit until they are too small to remain in the bed. Increasing the particle size of the sorbent feed promotes attrition, and allows the use of sorbents that might otherwise not be useful. An upper limit on sorbent size occurs when sorbent particles are so large, and thus, so few, that gaps occur in the bed where no sorbent is located; $SO_2$ fumes would be expected to escape from such gaps, thereby reducing the scrubbing efficiency.

Harder sorbent particles may not attrit fully, but eventually sulfate harden, particularly as they become smaller. The hardened particles remain in the bed, absorbing the conventional amount of $SO_2$ (typically, a third of the stoichiometric amount) before leaving the bed at overflow 260. The $SO_2$ removed by these particles directly reduces the required amount of microchip production needed to avoid wilting, although the total limestone requirement is higher than if the very soft limestone were used, where no particles experience sulfate hardening.

Under circumstances when harder sorbent is used, thus, the sorbent itself may serve as both sorbent and ballast.

MODIFICATIONS AND VARIATIONS

Regarding modifications and variations to the most preferred embodiment, refractory layers 204 and 206 may be replaced by a single refractory of intermediate density, or in large capacity units, by water-cooled walls. Secondary air pipe 236 may be designed to reinject solids, e.g., unburned carbon collected from a cyclone before the baghouse. The stones 250 may be replaced by other materials, such as stainless steel spheres, or by other constructions, such as inverted channels located over the bubble caps, that serve to reduce the velocity of the gases entering the bed to a sufficiently low value that particulate shattering is avoided. The baffle tubes 252 above the upper bed may be deleted, particularly if some additional freeboard is employed. The same is true of the baffle tubes above the middle bed. Other configurations of baffles that also prevent a line-of-sight opening may be used in place of the preferred configuration.

Downcomer 266 may be replaced by a vertical standpipe that passes through the middle-bed distributor assembly, and terminates in a trickle valve just above the storage bed's highest bed level. To actuate the downcomer, the trickle valve is opened a predetermined amount, high enough for the middle bed material to flow into the storage bed at a desired speed by gravity, but less than the speed at which the standpipe might be starved for bed material, thereby losing its pressure-sealing characteristic. When the downcomer is inactivated, the trickle valve is allowed to return to its closed position. Use of the alternate downcomer mechanism eliminates the need for the screw feeder shown in the preferred downcomer assembly, but requires a more careful adjustment of the trickle valve opening to operate correctly, and is somewhat more subject to malfunction due to the presence of large particulates in the middle bed.

The bubble cap design of the preferred embodiment is just one of many that might be considered; there are many bubble cap designs shown in the prior art that serve all of the functions identified; the preferred design has the advantage of being fabricated readily from commonly available components.

Lower-distributor plate 210 may be made of the water-cooled construction as are the upper distributor plates, or other mechanisms for the prevention of buckling, such as the use of bellows at the edge of the distributor plate, may be used to prevent buckling. The distributors may be designed to extend beyond casing 202, and be sealed against leakage by flanges attached to the outside of casing 202, instead of being attached to angle irons inside the casing, as shown in FIG. 1.

When the burner-desulfurizer 200 is used to generate high pressure steam, alternate methods may be used to cool the distributors. For example, a separate cooling loop may be used, whereby water is circulated with a separate pump through the distributors, to a water-to-water heat exchanger, and back to the distributors. The other side of the water-to-water heat exchanger is cooled by boiler feedwater. This method avoids the overheating of the distributors, thereby minimizing their thermal expansion and tendency to buckle, and also minimizes the pressure levels and corresponding structural requirements for the distributors, thereby reducing their weight and cost. The steam drum 326 is optional; alternatively, the inlet pipe 328 and float valve assembly 332 may be attached directly to the casing of the outlet manifold 316. Superheater tubes, if any, are located in the freeboard of the upper bed, if a small degree of superheat is required, and in a separate module similar to FIG. 1, if extensive superheating is required. In the latter case, the superheat tubes are located in the same position, relative to the distributor, as are tubes 234.

Other types of coal feeders may be used, such as weight-belt feeders. The coal drier may be eliminated if coal of moderate moisture is used, in conjunction with an air-swept crusher design that permits drying air to dry the coal within the crusher. The stirrer of coal drier 340 may be of a different design than that shown; for example, a spiral or pair of spirals may be used, instead of transverse pins 354. Also, transverse pins 356 are optional, particularly with coal that contains few fines below ¼ inch. The temperature of the air entering the drier may be thermostatically controlled to create the optimum coal outlet temperature of about 200 degrees F., regardless of the moisture. This avoids the possibility of overheating the coal, and starting a fire in the coal drier during shutdowns. It also allows the drying of coals whose moisture content is greater than 15%, by increasing the drier's air inlet temperature above 700 degrees F. The heat for the drier may come from a separately-fueled duct burner, rather than from a pipe in the middle bed as described in the preferred embodiment.

In the limestone pot, a rotary valve may be placed in standpipe 380, which prevents the escape of transport air into the upper bed, instead of to the baghouse hopper, its intended destination. The rotary valve replaces the pressure sealing effect of material in the overflow pipe 260 and standpipe 380, making the system less touchy and also allowing the use of greater pressures in the limestone pots, with correspondingly greater allowable distances between the limestone pot and the baghouse hopper.

Blast air pipes 396 and 376 are optional. Coal pot 344 is optional, and may be replaced by a simple transition pan, into which coal falls and from which coal is blown into the combustor-desulfurizer 200. In systems employing more than one coal feed pipe, the transition piece is made circular in cross-section and has a number of coal outlet pipes at its periphery, which are fed by a rotating spreader located at the center.

The burner-desulfurizer 200 of the preferred embodiment has a capacity of 10,000,000 BTU/hr. Actually, the design is suitable for a wide array of sizes ranging from the commercial sizes of 1 million BTU/hour to the electric utility size rated at up to 10 billion BTU/hour. The steam conditions at steam tubes 234 depend upon the application. In electrical utility generation, where the highest steam temperature and pressures are desired because of the effect on thermal efficiency, steam temperatures as high as 1200 degrees F. may be obtained, at supercritical pressures. These exceed the temperatures, by about 200 degrees F., of both conventional oil and coal-fired boilers and of conventional fluidized bed combustors, and may reduce the fuel consumption of such systems by 5 to 10 percent, as well as prolonging boiler life and improving maintainability. As has been taught elsewhere, (John Stringer, "Materials for Fluidized Bed Combustors," 3rd *Annual Conference on Materials for Coal Conversion and Utilization,* NBS, Gaithersburg, Md., October 1978, p. 154, et al.), the mechanism for fireside corrosion that had formerly limited the maximum steam temperatures of utility boilers is not present in fluidized-bed combustors, primarily because the alkalis released in conventional high temperature combustors are not released in the lower-temperature fluidized bed systems. But fluidized bed combustors do experience fireside corrosion, due to the presence of calcium sulfate that coats the steam tubes. This form of corrosion is eliminated by the use of sand, rather than sorbent, adjacent the steam tubes in the combustor-desulfurizer 200, thereby eliminating the corrosion-producing sulfate coating, and allowing the boiler to be operated at temperatures determined by factors other than fireside corrosion. In the larger systems, the burners would be built in modules to avoid the over-stressing of the steam tubes and distributors due to excessively large spans. To increase the capacity of the system, the cross-sectional area of the beds must be increased by one square foot per 500,000 BTU/hour. The burner height must be increased only to the extent that lateral velocities in the plenums 227, 237, and in the freeboard above the upper bed are kept low enough to avoid entrainment of bed material. Pipe diameters are increased proportionally to the capacity of the burner. One exception is the coal feed pipes: these are always about 1¼ inches in diameter, with one pipe required per 10 square feet of bed area. Above-the-bed feeding may be used, with larger coal particles and larger coal feed pipes, or spreaders, if the steam pipes are arranged with a sufficiently wide space at the plane of coal entry to allow the coal particles to be injected directly into the bed without hitting the pipes. The bubble cap dimensions and also the boiler tubes are not increased in diameter, although steam tubes' diameters may be increased somewhat for greater strength when they are used to span greater spans than those of the unit in FIG. 1.

Any type of coal may be used, of any rank, sulfur content, moisture, caking characteristic, or ash content. Waste fuels, containing large amounts of inert material, such as culm or shale, may also be burned, as may unreactive fuels such as coke breeze. In the former case, some or all of the steam tubes may have to be moved out of the splash zone of the middle bed; this is achieved by removing tubes 234, or raising them far enough to avoid their being splashed by bed material when the bed depth is at its minimum value. Other fuels including wood chips, as well as oil and natural gas, may also be used. For these fuels, a method of injecting the fuel into the bed at close intervals is required; such methods have been described in the prior art. Provisions for these fuels would allow the unit to be operated whenever changes in fuel prices or unavailability of supplies indicates a switch in the fuel type. Burning of oil in the combustor-desulfurizer 200 may also be preferrable to the burning of this fuel in conventional boilers, particularly if the oil contains an objectionably high sulfur level; the levels of nitric oxide may also be reduced without the use of a scrubber, and the maximum steam temperature that may be achieved without the occurrence of fireside corrosion, may also be increased.

Burner-desulfurizer 200 may be located within the firebox of a boiler, or constructed as a separate unit (a so-called "dutch oven") as shown in FIG. 1. In this case, multifuel capability of the burner-boiler system may also be provided by operating the burner-desulfurizer 200 only with solid fuels and removing the smokepipe 262 from the boiler and installing in its place a gas or oil burner, whenever these fuels are required. This approach achieves an extra level of reliability for the overall system, though it reduces the steam capacity and thermal efficiency in comparison with the configuration where gas or oil are added at the middle bed.

A wide variety of limestone types, including dolomites, are suitable; approximately half of all calcium carbonates appear suitably attrition-prone to be useful. Synthetic sorbents, consisting of lime that has been ground to 10 microns or under, and cemented with a pozzolanic material, may also be useful.

Nothing about the dimensions of the beds, steam tube geometry, bubble cap spacing, or materials used in the burner-desulfurizer, is critical, although certain trends cause a deterioration of performance as the optimum conditions are passed. In particular the use of greater middle bed depths increases the violence of the bubbling and with it, the need for provisions to improve combustion efficiency, such as increased freeboard heights, fly ash reinjection or the use of a separate carbon burn-up cell, and combustion air preheating. The use of greater bed depths in the desulfurizing bed has less serious effects and may, in fact, improve desulfurization and denitrification; as long as splash-preventing baffles are used above the upper bed, freeboard requirements are not greatly increased.

Startup may be accomplished by leaving the propane burner on until the middle bed reaches a temperature of 1100 degrees F., at which point the preheat burner is extinguished and normal coal-fired operation commences; the step of adding coal for a minute, to assist in preheating, may be dispensed with.

The coarseness of sand and sorbent may be varied, so long as fluidization and mixing are sufficient under all conditions to avoid hot spots or clinkering. The heat release per unit area may also be varied, by ±25%, or more, if adequate precautions are taken to prevent defluidization, at low velocities, or excessive carbon losses at the high extreme. Fly ash reinjection may be employed to improve carbon utilization and help desulfurization, the reinjected particles being injected into either the primary or secondary air streams.

Coal sizes other than those indicated may be used, although an excess of fines, of under 28-mesh, will cause increasing difficulties in achieving high combustion efficiencies, any may cause the plugging of the upper distributor.

Burner-desulfurizer 200 may be used to heat other fluids in tubes 234, such as air that may be used in ovens, or compressed air, that may be used to drive gas turbines in combined cycles that are used to generate electricity, or in cogeneration units, that produce both electricity and heat.

Figure 9:
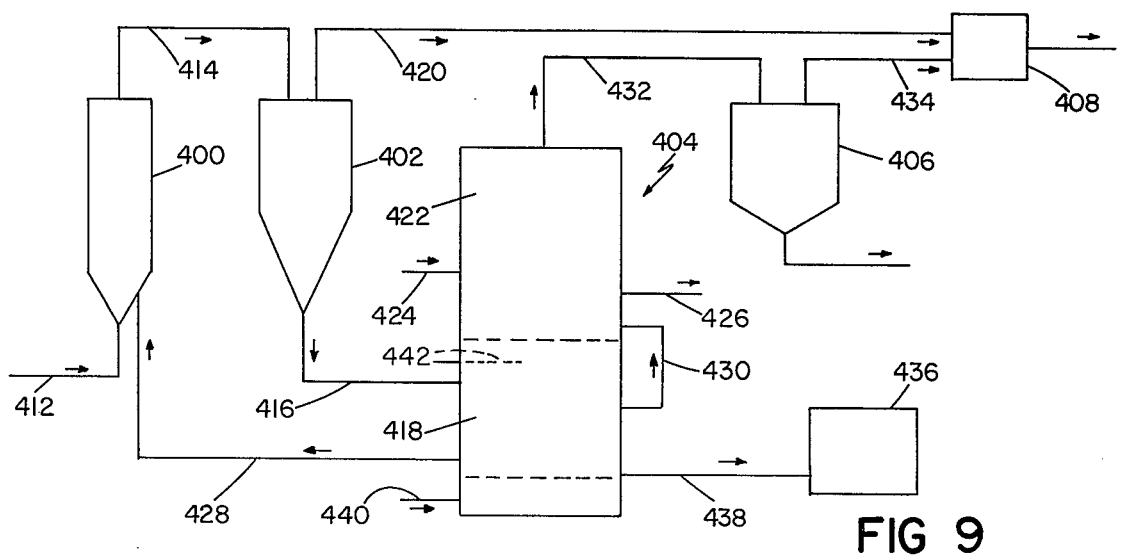
FIG. 9 is a schematic view of a coal burning and desulfurizing system.

Another variation in operation is to use the combustor-desulfurizer of FIG. 1 as the char burner in U.S. Pat. No. 4,051,791, entitled "Coal Burning Arrangement," granted Oct. 4, 1977, and hereby incorporated herein by reference. FIG. 9 shows this use of the combustor-desulfurizer in a system including pyrolyzer 400, char cyclone 402, combustor-desulfurizer 404, ash cyclone 406, and afterburner 408. Coal and limestone are pneumatically fed through line 412 to pyrolyzer 400. Coal is pyrolyzedin pyrolyzer 400 to form finely sized char (minus four mesh) and to produce volatiles including hydrogen sulfide. Limestone is calcined in the pyrolyzer to form lime (CaO), which scrubs the hydrogen sulfide in the volatiles stream by the reaction:

$$H_2S + CaO \rightarrow CaS + H_2O \qquad (1)$$

The calcium sulfide is then ducted with the char and volatiles by line 414 to char cyclone 402, where gases are separated from solids, and then by line 416 to the combustor stage 418 of combustor-desulfurizer 404 (which could be the combustor-desulfurizer of FIG. 1 with the storage fed and the steam tubes 234 removed). Gases from char cyclone 402 are carried to afterburner 408 by line 420. Char is then burned in the combustor stage 418, which is operated from 1800° to 2000° F., (preferably at 1900° F.). Calcium sulfide is oxidized back to lime by the excess air in the combustor by the reaction:

$$CaS + 3/2 O_2 \rightarrow CaO + SO_2 \qquad (2)$$

The sulfur dioxide emitted by this regeneration of lime and the sulfur dioxide released by char combustion are then scrubbed by lime in desulfurizer stage 422 (operated at from 1450° to just over 1600° F., preferably at 1550° F.; SO$_2$ scrubbing efficiency drops off rapidly above 1600° F.) of combustor desulfurizer 404:

$$CaO + SO_2 + \tfrac{1}{2} O_2 \rightarrow CaSO_4 \qquad (3)$$

The lime in reaction (3) is added to desulfurizer stage 422 through line 424 as limestone and is in proportion to the amount of sulfur originally in the coal and the degree of desulfurization required. The spent sorbent too coarse to be blown out of the combustor-desulfurizer 404 is removed from desulfurizer 422 through line 426 to a disposal site or ash hopper (not shown). The spent sorbent will be a mixture of CaO and $CaSO_4$, an inert material that may be disposed of with little or no further treatment.

The remaining sorbent is elutriated from bed 422, and is removed from the system at ash cyclone 406 or at a particle collector located downstream of the furnace (not shown) to which afterburner 408 is attached.

The material in the combustor bed 418, consisting mostly of CaO, is recycled to the pyrolyzer through line 428 and is there converted to CaS by reaction (1). Thus fresh limestone is fed through line 412 to the pyrolyzer only to replenish the amount of limestone that has become unreactive after a number of cycles through the combustor bed and pyrolyzer. This replenishment would be zero if the limestone were to retain its reactivity, insofar as the circulating stream acts as a sulfur carrier and does not actually remove sulfur from the system. On the other hand, sorbent added to the desulfurizer bed 422 actually removes sulfur from the system, according to reaction (3). The partially-spent sorbent in the combustor bed is not wasted, but is disposed through line 430 to the upper desulfurizer bed, where it is used to absorb $SO_2$ before being disposed of through line 426.

Hot combustion gases and ash are transported from the desulfurizer bed through line 432 to ash cyclone 406, where the ash is removed, and the gases then go via line 434 to afterburner 408, where they are mixed with the volatiles from char cyclone 402 and are burned at very high temperatures (e.g., 3000° F.).

One problem with operating the combustor bed at temperatures in the vicinity of 1900° F. is that the sorbent may sinter, reducing its reactivity after a number of cycles, and clinkering of the ash from some types of coal may occur. Accordingly, the combustor bed can be operated at a lower temperature range from 1650° to 1800° F. to avoid these problems (and to give added advantages of reduced emission of alkalis and an easing of fireside corrosion problems), but the efficiency conversion of calcium sulfide to lime in the combustor bed may also fall at these lower temperatures, although enough should be converted to return to the pyrolyzer. Another problem is that if the temperature is too low, CaS may be converted to $CaSO_4$ instead of CaO and the $CaSO_4$ may form a eutectic with CaS to produce a clinker. To avoid having to dispose of a large amount of CaS, which may cause formation of $H_2S$ at the disposal site, a post-treatment station 436 is added to the system. Instead of disposing partially-spent sorbent to the desulfurizer bed by line 430, the sorbent is transported by line 438 to station 436, where it is treated (e.g., by washing in hot carbonated water, as taught by G. P. Curran et al. in "The Conoco Process for Hot Desulfurization of Fuel Gas: A Progress Report," Conoco Coal Development Co., as reported in "Proceedings of the Fourth International Conference on Fluidized-Bed Combustion," Dec. 9-11, 1975, held at Mitre Corp., McLean, Va., pp. 239-263) to yield acceptably CaS-free stone. Because the quantity of sorbent undergoing post-treatment is relatively small, post-treatment should be an economically viable alternative to high-temperature regeneration.

Combustor-desulfurizer 404, whether or not a post-treatment is used, is preferably operated as an adiabatic fluid-bed combustor in that the combustor will be cooled with excess air (typically, 150%) added to the combustion air (which enters through line 440) rather than by indirect cooling with immersed tubes. Secondary air, added at line 442, cools the gases emerging from combustor bed 418 to the temperature at which the desulfurizer bed best operates.

Further information regarding regeneration of sorbent can be found in Moss U.S. Pat. No. 3,870,480, hereby incorporated herein by reference.

One modification of combustor-desulfurizer 404 for the system of FIG. 9 is to use immersed tubing in combustor bed 418 to carry cooling air instead of operating the bed as an adiabatic fluid-bed combustor with excess air added to the combustion air. This modification would enable the char burner 404 and ash cyclone 406 to be substantially reduced in size. However, choice of this modification must take into account the fact that the tubes may become very hot and thereby be subject to corrosion.

Another modification eliminates the recirculation pipe 428, whereby the limestone is fed through the system on a once-through basis. This simplifies the material handling problem, but increases the amount of residue that must be treated at post-treatment reactor 436 if such a reactor is required.

In each of the above versions of FIG. 9, an attrition-resistant sorbent is required; otherwise, the sorbent will be elutriated from combustion zone 418, or even be small enough to bypass char cyclone 402, in which case the sorbent may pass as CaS through the afterburner 408 and associated furnace, eventually contaminating the solid residue collected at the furnace's outlet and perhaps making it unsuitable for landfill without further treatment. Use of attrition-resistant sorbents may limit the availability of suitable materials, and increase their cost. If the same sorbent is used at both lines 412 and 424, as would commonly be done, the attrition-resistance of the sorbent in desulfurizer bed 422 would cause that bed to wilt, thereby increasing its sorbent consumption rate while reducing its scrubbing efficiency, as has been described with combustor-desulfurizer 200 when used to generate steam.

These problems may be avoided, and the use of attrition-prone sorbents be used in a manner similar to their use in combustor-desulfurizer used to generate steam, if a separate desulfurizing bed (not shown) is interjected into line 420. Sorbent would now be added to the separate desulfurizer, instead of at pyrolyzer 400, from which spent sorbent would flow to burner-desulfurizer 404, entering it at line 416. In the separate desulfurizer, volatiles leaving char cyclone 402 would enter through a distributor plate at the vessel's bottom, and leave at an exit port at the vessel's top. Sorbent flow would be in the opposite direction, to provide counterflow reaction. The desulfurizer would be sized large enough to provide fixed-bed conditions, thereby minimizing attrition within the reactor.

Other combinations will be obvious to those skilled in the art. For example, in the system incorporating the separate desulfurizer in line 420, it may be useful to add a third distributor and bed to combustor 404. Char would be combusted in the lower bed, as in FIG. 9, and sorbent (mostly Ca/S) would be converted to CaO in the middle bed, while the removal of $SO_2$ (reaction 3) would be accomplished in the uppermost bed. With this method, the fireside corrosion of air tubes in the combustion bed would be minimized, because it would remove the sorbent from the vicinity of the tubes that has been observed to promote fireside corrosion, as has been described.

The subject matter claimed in this application is also useful in single-bed combustors. In such devices, the fluidizing velocity should be in the range of 5 to 10 times minimum fluidization velocity (whereas in two-bed designs fluidizing velocity should be from 2 to 4 times minimum fluidization velocity).

Unclaimed Disclosure

Certain subject matter disclosed above but not claimed herein was the joint invention of the undersigned and of Stephen P. Perkins and is the planned subject matter of one or more patent applications to be filed hereinafter.

What is claimed is:

1. The method of combustion which comprises
providing a layer of a first particulate material supported on a first distributor plate,
said first particulate material being incombustible,
fluidizing said first particulate material with a stream of air to provide a first fluidized bed,
said first fluidized bed being contained in a first zone of height proper to prevent loss of said first particulate material,
introducing into said first fluidized bed a minor proportion of a flowable combustible fuel,
burning said flowable combustible fuel in said air to form combustion gas,
providing downstream of said first fluidized bed a second layer of a second particulate material supported on a second distributor plate,
said second particulate material containing a sorbent for a component of said combustion gas,
fluidizing said second particulate material by passing said combustion gas through said second distributor plate to provide a second fluidized bed,
said second fluidized bed being contained in a second zone of height proper to prevent loss of said second particulate material,
transporting said combustion gas against discrete objects too heavy to be moved by said combustion gas flow to slow velocity into said second fluidized bed,
providing a quantity of microchips by interparticle collision in said second fluidized bed at a rate to provide new reactive surface area as fast as reaction depletes formerly reactive surface area,
introducing into said second fluidized bed a nonsorbent ballast, and
controlling the depth of said second fluidized bed in order to control fluidization and elutriation.

2. The process of claim 1 in which said flowable combustible fuel is crushed coal.

3. The process of claim 1 in which said sorbent is a desulfurizer.

4. The process of claim 3 in which said objects are rocks.

5. The process of claim 3 in which the active desulfurizing ingredient in said sorbent feed material is calcium carbonate.

6. The process of claim 5 in which said second fluidized bed is at a temperature in the range of 1450° F. to 1600° F.

7. The process of claim 5 in which said second particulate material is of size in the range of plus ¼" minus 1".

8. The process of claim 1 in which said objects cover bubble caps in said second distributor plate and through which said combustion gas moves.

9. The process of claim 1 in which fluidizing velocity in said second fluidized bed is from 2 to 4 times minimum fluidizing velocity.

10. The process of claim 1 in which the depth of said second fluidized bed is in the range 4" to 9".

11. The process of claim 1 in which a relatively finer, more easily fluidizable second particulate material is used at startup than during steady-state operation.

12. The process of claim 11 in which no nonsorbent particulate is introduced into said second fluidizing zone during startup.

* * * * *